(12) United States Patent
Nueraji et al.

(10) Patent No.: US 8,986,848 B2
(45) Date of Patent: Mar. 24, 2015

(54) COATINGS

(75) Inventors: Nuerxiati Nueraji, Brooklyn, NY (US);
Albert J. Swiston, Baltimore, MD (US);
Michael F. Rubner, Westford, MA (US);
Robert E. Cohen, Jamaica Plain, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 299 days.

(21) Appl. No.: 12/792,463

(22) Filed: Jun. 2, 2010

(65) Prior Publication Data

US 2010/0304163 A1 Dec. 2, 2010

Related U.S. Application Data

(60) Provisional application No. 61/183,312, filed on Jun. 2, 2009.

(51) Int. Cl.
| | | |
|---|---|---|
| *B32B 27/30* | (2006.01) | |
| *C09D 133/14* | (2006.01) | |
| *C08B 11/12* | (2006.01) | |
| *C09D 5/00* | (2006.01) | |
| *C08B 37/08* | (2006.01) | |
| *C09D 139/00* | (2006.01) | |
| *C09D 105/08* | (2006.01) | |
| *C09D 133/26* | (2006.01) | |
| *C09D 133/02* | (2006.01) | |
| *G02B 27/00* | (2006.01) | |
| *C09D 101/28* | (2006.01) | |
| *G02B 1/10* | (2006.01) | |
| *C09D 133/06* | (2006.01) | |

(Continued)

(52) U.S. Cl.
CPC .......... *G02B 27/0006* (2013.01); *C09D 133/14*
(2013.01); *C08L 39/00* (2013.01); *C08B 11/12*
(2013.01); *C09D 5/00* (2013.01); *C08B 37/003*
(2013.01); *C08L 33/02* (2013.01); *C09D 139/00*
(2013.01); *C09D 105/08* (2013.01); *C09D
133/26* (2013.01); *C09D 133/02* (2013.01);
*C08L 33/26* (2013.01); *C09D 101/286*
(2013.01); *G02B 1/10* (2013.01); *C09D
133/064* (2013.01)
USPC ........................... 428/522; 428/441; 428/442

(58) Field of Classification Search
USPC ........................................ 428/441, 442, 522
See application file for complete search history.

(56) References Cited

U.S. PATENT DOCUMENTS

| | | | | |
|---|---|---|---|---|
| 6,506,446 B2 * | 1/2003 | Yamamoto et al. | ........... | 427/165 |
| 2003/0215626 A1 | 11/2003 | Hiller et al. | ................ | 428/304.4 |

(Continued)

FOREIGN PATENT DOCUMENTS

| | | |
|---|---|---|
| WO | WO 2006/097113 | 9/2006 |
| WO | WO 2007/118794 | 10/2007 |

(Continued)

OTHER PUBLICATIONS

G. Decher, Science 1997, 277, 1232.

(Continued)

*Primary Examiner* — D. S. Nakarani
(74) *Attorney, Agent, or Firm* — Steptoe & Johnson LLP

(57) ABSTRACT

A hydrophilic coating can be applied to virtually any surface to produce a long-lasting, durable antifog effect. The coating includes a molecular-level blend of hydrophilic polymers. The coating can be assembled using a layer-by-layer assembly process.

8 Claims, 12 Drawing Sheets

(51) Int. Cl.
*C08L 39/00* (2006.01)
*C08L 33/02* (2006.01)
*C08L 33/26* (2006.01)

(56) References Cited

U.S. PATENT DOCUMENTS

| | | | |
|---|---|---|---|
| 2004/0021941 A1 | 2/2004 | Iori et al. | 359/494 |
| 2006/0029634 A1 | 2/2006 | Berg et al. | 424/422 |
| 2007/0104922 A1 | 5/2007 | Zhai et al. | 428/141 |
| 2007/0166513 A1 | 7/2007 | Sheng et al. | 428/141 |
| 2008/0268229 A1 | 10/2008 | Lee et al. | 428/323 |

FOREIGN PATENT DOCUMENTS

| | | |
|---|---|---|
| WO | WO 2008/040648 | 4/2008 |
| WO | WO 2009/009185 | 1/2009 |

OTHER PUBLICATIONS

Mendelsohn et al., Langmuir 2000, 16, 5017.
Fery et al., Langmuir 2001, 17, 3779.
Shiratori et al., Macromolecules 2000, 33, 4213.
Irvine et al., *Biomacromolecules* 2, 85 (2001).
Mayes et al., *J. Mem. Sci.* 298, 136 (2007).

* cited by examiner

COATINGS

CLAIM OF PRIORITY

This application claims priority to provisional U.S. Patent Application No. 61/183,312, filed on Jun. 2, 2009, which is incorporated by reference in its entirety.

FEDERALLY SPONSORED RESEARCH OR DEVELOPMENT

This invention was made with Government Support under Grant No. DMR-0213282, awarded by the National Science Foundation. The Government has certain rights in this invention.

TECHNICAL FIELD

This invention relates to coatings.

BACKGROUND

Many substrates, whether transparent, translucent, or opaque, become fogged when a surface of the substrate is cooler than the dew point of the surrounding air—for example, when a cooled surface is exposed to moist air. Transparent substrates such as vehicle windows, airplane windshields and windows, packages for foods, plastic sheets for vegetable gardens, greenhouse windows, optical eyewear (eyeglasses, sunglasses, goggles, faceshields, etc.), binoculars, camera lenses, endoscopic lenses, and other optical instruments, are all vulnerable to fogging. Non-transparent and/or reflecting surfaces of plastics, ceramics and metals are also subject to fogging or moisture condensation on their surfaces. The fogging of optical elements such as eyeglasses and car windows can be a nuisance, or in many cases, a serious hazard. A number of different types of coatings and additives have been used to address fogging, especially of optical surfaces. Despite considerable work devoted to this problem, there remains a need for an effective, inexpensive, and durable long-lasting antifog coating that can be generally applied (i.e., without extensive customization and optimization of manufacturing conditions) to surfaces of interest. This is why very few products available today are sold with permanent antifog capability.

SUMMARY

Polyelectrolyte multilayers can be easily assembled on a variety of surfaces. Selection of the materials, assembly conditions, and post-processing conditions can be used to control the chemical, structural and optical properties of the final product. Stable, durable coatings can be formed from layer-by-layer assembled films including polyelectrolytes. The coatings can provide durable antifogging properties to surfaces, particularly optical surfaces.

A hydrophilic coating can be applied to virtually any surface to produce a long-lasting, durable antifog effect. The coating can include a molecular-level blend of at least two hydrophilic polymers. The coating can be made, for example, by a layer-by-layer assembly process, though other techniques can be used. The layer-by-layer assembly can be a water based process, thereby avoiding solvents and chemicals that can damage many plastic substrates (such as polycarbonate and poly(methyl methacrylate)) that are widely used in optical applications. The conformal coatings can be applied by, for example, a dip-, spin-, or spray-assembly process. The antifog coatings can be highly transparent and have highly effective antifogging performance under a variety of conditions. The durability of the coatings can be increased by a variety of common crosslinking and surface modification methods.

In one aspect, an article includes a surface coated with an antifog coating, the coating including a first hydrophilic polymer and a second hydrophilic polymer; where the first and second hydrophilic polymers are molecularly blended.

The coating can include a first layer including the first hydrophilic polymer, and a second layer including the second hydrophilic polymer. The first hydrophilic polymer and the second hydrophilic polymer can be intermingled. The coating can include a sequence of layers including a plurality of first layers including the first hydrophilic polymer alternating with a plurality of layers including the second hydrophilic polymer.

In another aspect, an article includes a surface coated with an antifog coating, the coating including a sequence of layers including a plurality of first layers including a first hydrophilic polymer alternating with a plurality of layers including a second hydrophilic polymer, wherein the first hydrophilic polymer and the second hydrophilic polymer are intermingled. The first layer can consist essentially of the first hydrophilic polymer. The second layer can consist essentially of the second hydrophilic polymer.

In another aspect, a method of coating a surface of an article with an antifog coating, includes depositing on the surface a composition including molecularly blended first and second hydrophilic polymers.

Depositing can include contacting the surface with a first aqueous solution including the first hydrophilic polymer. Depositing can further include contacting the surface with a second aqueous solution including the second hydrophilic polymer. Depositing can include forming a first layer including the first hydrophilic polymer, and forming a second layer including the second hydrophilic polymer. Depositing can include selecting the first hydrophilic polymer and the second hydrophilic polymer such that the first hydrophilic polymer and the second hydrophilic polymer intermingle when deposited.

Depositing can include forming a sequence of layers including a plurality of first layers including the first hydrophilic polymer alternating with a plurality of layers including the second hydrophilic polymer.

Depositing can include alternately contacting the surface with a first aqueous solution including the first hydrophilic polymer and contacting the surface with a second aqueous solution including the second hydrophilic polymer.

Contacting the surface with the first aqueous solution can include dip coating, spray coating, spin coating, or a combination thereof. Contacting the surface with the second aqueous solution can include dip coating, spray coating, spin coating, or a combination thereof.

The method can further include contacting the deposited composition with a chemical cross-linking reagent. The method can further include exposing the surface to a temperature sufficient to thermally cross-link the first hydrophilic polymer and the second hydrophilic polymer but insufficient to deform the article.

In another aspect, a method of coating a surface of an article with an antifog coating, includes alternately contacting the surface with a first aqueous solution including a first hydrophilic polymer and contacting the surface with a second aqueous solution including a second hydrophilic polymer.

The first hydrophilic polymer can include a plurality of ionized or ionizable groups. The second hydrophilic polymer can include a plurality of ionized or ionizable groups. The second hydrophilic polymer can include a plurality of hydrogen bonding groups. At least one of the first and second hydrophilic polymers can be a copolymer including a first plurality of ionized or ionizable groups and a second chemically distinct plurality of hydrogen bonding groups.

The first hydrophilic polymer can be selected from the group consisting of a chitosan (CHI), a poly(allylamine)-co-poly(ethylene oxide) copolymer (PAH-g-PEG), a poly(L-lysine)-co-(polyethylene oxide) (PLL-g-PEG), a poly(quarternized-4-vinylpyridine)-co-poly(ethylene oxide) (QPVP-co-PEG), a poly(diallyldimethylammonium chloride)-co-poly(ethylene oxide) (PDADMA-co-PEG), a poly(allylamine)-co-polyacrylamide copolymer (PAH-co-PAAM), a poly(L-lysine)-co-polyacrylamide (PLL-co-PAAM), poly(quarternized-4-vinylpyridine)-co-polyacrylamide (QPVP-co-PAAM), a poly(diallyldimethylammonium chloride)-co-polyacrylamide (PDADMA-co-PAAM), a poly(allylamine)-co-polyacrylamide copolymer (PAH-co-PAAM), and a combination thereof.

The second hydrophilic polymer can be selected from the group consisting of carboxymethyl cellulose (CMC), a alginic acid (AA), a hyaluronic acid (HA), a heparin, a pectin, a poly(acrylic acid)-co-poly(ethylene oxide) copolymer (PAA-co-PEG), a poly(methacrylic acid)-co-poly(ethylene oxide) copolymer (PMAA-co-PEG), a poly(acrylic acid)-co-polyacrylamide copolymer (PAA-co-PAAM), a poly(methacrylic acid)-co-polyacrylamide (PMAA-co-PAAM), a carrageenan ($\kappa$, a 1, a $\lambda$), a fucoidan, a fucogalactan, a chondroitin, a gellan gum, a gum karaya, a gum tragacanth, a welan gum, a xanthan gum, a psyllium seed gum, and a combination thereof.

The first hydrophilic polymer can be selected from the group consisting of carboxymethyl cellulose (CMC), a alginic acid (AA), a hyaluronic acid (HA), a poly(acrylic acid)-co-poly(ethylene oxide) copolymer (PAA-co-PEG), a poly(methacrylic acid)-co-poly(ethylene oxide) copolymer (PMAA-co-PEG), a poly(acrylic acid)-co-poly(acrylamide) copolymer (PAA-co-PAAM), a poly(methacrylic acid)-co-poly(acrylamide) (PMAA-co-PAAM), and a combination thereof.

The second hydrophilic polymer can be selected from the group consisting of poly(ethylene oxide) (PEG), a polyacrylamide (PAAM), a poly(vinyl alcohol) (PVA), a poly(vinyl pyrrolidone) (PVP), a chitosan, a chitin, a inulin, a laminaran, a pullulan, a curdlan, a scleroglucan, a tara gum, a tamarind gum, a guar gum, a mannan, a dextran, a glycogen, a cellulose, and a combination thereof.

The first hydrophilic polymer and the second hydrophilic polymer can be chemically cross-linked to one another, or can be thermally cross-linked to one another. The article can be an optical component; for example, the article can be an eyewear lens. The article can be transparent, and have a relative transmittance ($T_r$) of greater than 90% after being exposed to 100% humidity at 23° C. for at least 60 seconds. The article can be transparent, and have a haze of less than 1.0% after being exposed to 100% humidity at 23° C. for at least 60 seconds.

The details of one or more embodiments are set forth in the accompanying drawings and the description below. Other features, objects, and advantages will be apparent from the description and drawings, and from the claims.

BRIEF DESCRIPTION OF THE DRAWINGS

FIGS. 5A-5D are photographs depicting results of a humid chamber test for antifog coatings. Crosslinked 10-bilayer CHI/CMC coatings on polycarbonate were exposed to at 80% humidity at 37° C. for (A) 1 second; (B) 10 seconds; (C) 20 seconds; and (D) 60 seconds. Fogged region at the bottom of the substrate is not coated.

FIGS. 6A-6B are photographs depicting results of a humid chamber test for antifog coatings. 10-bilayer CHI/PAA-g-PEG (37% PEG) coatings were exposed to 80% humidity at 37° C. for (A) 1 second; and (B) 20 seconds. Fogged region at the bottom of the substrate is not coated.

DETAILED DESCRIPTION

Figure 1:
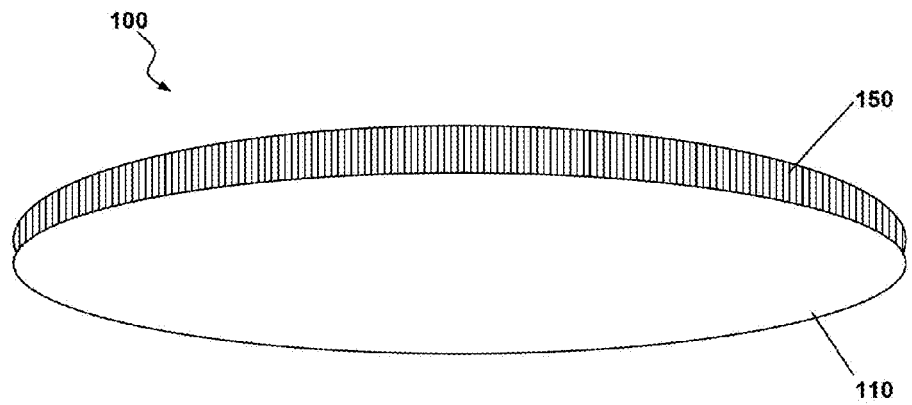
FIG. 1 is a schematic drawing of a coated article.

Coatings having desirable antifog properties can be achieved by molecular level blending of at least two hydrophilic polymers. The hydrophilic polymers can have a high concentration of hydrophilic functional groups, such as, for example, carboxylic acid, amino, alkyl ether, and hydroxyl groups, to name a few. The hydrophilic polymers can include one or more polyelectrolytes (e.g., polycations, polyanions, or polymers including both cationic and anionic groups), one or more neutral hydrophilic polymers (e.g., polyalkylene ethers, polyacrylamides, polyols), or a combination of one or more polyelectrolytes and one or more neutral hydrophilic polymers. The antifog coatings can have hydrogen bonding interactions between hydrophilic polyelectrolytes and neutral hydrophilic polymers. Neutral and charged polysaccharides can be used in the antifog coatings.

Molecularly blended polymers can have an intermixed structure on the molecular level when blended or combined. In some cases, two polymers may each be separately soluble in water, but simply mixing the solutions results in uncontrolled precipitation of both. These uncontrolled precipitates are often not well mixed on the molecular level. In contrast, a sequence of polymer layers, as may be obtained via layer-by-layer assembly, is intermixed and interpenetrated on the molecular level. The polymers in this sequence can be referred to as molecularly blended.

Porosity, texture, and the chemical nature of the surface can influence the wetting properties of surfaces. See, for example, U.S. Patent Application Publication Nos. 2003/0215626, 2006/0029634, 2007/0104922, 2007/0166513, 2008/0268229, provisional U.S. Patent Application No. 61/061,806, and International Patent Application Publication WO 2009/009185, each of which is incorporated by reference in its entirety. Depending on the structure and chemical composition of a surface, the surface can be hydrophilic, hydrophobic, or at the extremes, superhydrophilic or superhydrophobic. One method to create the desired texture is with a polyelectrolyte multilayer. Polymer multilayers (including, for example, polyelectrolyte multilayers) can provide a surface with predetermined chemical and structural features so as to confer desired wetting and optical properties to surfaces.

Hydrophilic surfaces attract water; hydrophobic surfaces, by comparison, have energetically unfavorable interactions with water. These relatively unfavorable interactions result in familiar characteristics of hydrophobic surfaces, such as the beading and rolling of rainwater that lands on the hood of a recently waxed car. In general, a non-hydrophobic surface can be made hydrophobic by coating the surface with a hydrophobic material. The hydrophobicity of a surface can be measured, for example, by determining the contact angle of a drop of water on the surface. The contact angle can be a static contact angle or dynamic contact angle. A dynamic contact angle measurement can include determining an advancing contact angle or a receding contact angle, or both. A hydrophobic surface having a small difference between advancing and receding contact angles (i.e., low contact angle hysteresis) can be desirable. Water droplets travel across a surface having low contact angle hysteresis more readily than across a surface having a high contact angle hysteresis.

Layer-by-layer processing of polymer multilayers can be used to make conformal thin film coatings with molecular level control over film thickness and chemistry. Charged polyelectrolytes can be assembled in a layer-by-layer fashion. In other words, positively- and negatively-charged polyelectrolytes can be alternately deposited on a substrate. In some cases, an electrostatically neutral hydrophilic polymer can be substituted for a polyelectrolyte.

A hydrophilic polymer can include a plurality of ionized or ionizable functional groups. A polyelectrolyte can be polycationic or polyanionic. A polycation has a backbone with a plurality of positively charged functional groups attached to the backbone, for example, poly(allylamine hydrochloride). A polyanion has a backbone with a plurality of negatively charged functional groups attached to the backbone, such as sulfonated polystyrene (SPS) or poly(acrylic acid), or a salt thereof. Some polyelectrolytes can lose their charge (i.e., become electrically neutral) depending on conditions such as pH.

The ionization state of the ionized or ionizable functional groups may depend strongly on pH. For example, a polyelectrolyte can include functional groups that can exist as an acid/conjugate base pair, such as —COOH/—COO$^-$, or as a base/conjugate acid pair, for example, —NH$_2$/—NH$_3^+$. The pK$_a$ of an ionized or ionizable functional group can be in the range of, for example, 2 to 12, 3 to 11, or 4 to 10. Some ionized functional groups maintain an electrostatic charge largely independently of pH. For example, a quaternary amine functional group (e.g., —NR$_3^+$) can be positively charged with relatively little influence from pH.

A hydrophilic polymer can include a plurality of hydrogen bonding (or H-bonding) functional groups. Generally, hydrogen bonding functional groups can be either H-bond acceptors (e.g., a lone pair of electrons; a carbonyl oxygen is frequently an H-bond acceptor) or H-bond donors. H-bond donor functional groups are typically characterized by the presence of water-exchangeable hydrogen atom; for example, a hydroxyl group includes a water exchangeable hydrogen atom and can frequently participate in a hydrogen bond as an H-bond donor. The hydroxyl group can become ionized under sufficiently basic conditions; however, most organic hydroxyl groups will be neutral in most aqueous solutions. For example, a functional group can be considered a hydrogen bonding group, but not an ionized or ionizable group, when it has a pK$_a$ outside the range of, e.g., 2 to 12, 3 to 11, or 4 to 10. Some functional groups, such as amino groups, can be considered as both hydrogen bonding and ionized or ionizable.

Some polymers can include multiple different ionized or ionizable or hydrogen bonding functional groups. One such example is poly-L-lysine, includes multiple amino groups (ionized or ionizable) and multiple peptide bonds (include H-bond donors and acceptors). Another example is chitosan, poly(beta-1,4-D-glucosamine), which includes multiple hydroxyl groups and multiple amino groups. A copolymer can also include different monomer units, some of which include hydrophilic functional groups and some of which include ionized or ionizable functional groups; these ionized or ionizable functional groups can be cationic or anionic, or the copolymer can include both cationic and anionic monomer units. Some examples of copolymers including both hydrogen bonding functional groups and ionized or ionizable functional groups include poly(L-lysine)-co-(polyethylene oxide)(PLL-g-PEG), poly(quarternized-4-vinylpyridine)-co-poly(ethylene oxide)(QPVP-co-PEG), poly(acrylic acid)-co-poly(ethylene oxide) copolymer (PAA-co-PEG), and poly(acrylic acid)-co-polyacrylamide copolymer (PAA-co-PAAM). The copolymers can be, for example, random copolymers, block copolymers, graft copolymers, or other copolymer.

One method of depositing the polymers is to contact the substrate with an aqueous solution of the polymer at an appropriate pH. The pH can be chosen such that a polyelectrolyte is partially or weakly charged. The multilayer can be described by the number of bilayers it includes, a bilayer resulting from the sequential application of two different polymers, e.g., two oppositely charged polyelectrolytes. For example, a multilayer having the sequence of layers PAH-PAA-PAH-PAA-PAH-PAA would be said to be made of three bilayers.

FIG. 1A schematically shows article 100 having a hydrophilic coating 150 on a surface of substrate 110. Coating 150 can include molecularly blended hydrophilic polymers. When hydrophilic polymers are deposited on the surface in a layer-by-layer process, the resulting layers may become highly interpenetrated. For example, the hydrophilic polymers of one layer may intermingle with hydrophilic polymers of a second (chemically distinct) layer. In some circumstances, the intermingling or interpenetrating may occur to an extent such that boundaries between layers are indistinct.

These methods can provide molecular control over the deposition process by simple adjustments to the conditions (e.g., pH, ionic strength, and temperature) of the processing solutions. The properties of weakly charged polyelectrolytes can be precisely controlled by changes in pH. See, for example, G. Decher, Science 1997, 277, 1232; Mendelsohn et al., Langmuir 2000, 16, 5017; Fery et al., Langmuir 2001, 17, 3779; Shiratori et al., Macromolecules 2000, 33, 4213; and U.S. Patent Application Publication No. 2003/0215626, each of which is incorporated by reference in its entirety. A coating of this type can be applied to any surface amenable to the water based layer-by-layer (LbL) adsorption process used to construct these polyelectrolyte multilayers. Because the water based process can deposit hydrophilic polymers wherever the aqueous solution contacts a surface, even the inside surfaces of objects having a complex topology can be coated. In general, a hydrophilic polymer can be applied to a surface by any method amenable to applying an aqueous solution to a surface, such as dipping or spraying.

Broadband antireflectivity can be attained using an inexpensive, simple process employing aqueous solutions of polymers. See, for example, U.S. Patent Application Publication No. 2003/0215626, which is incorporated by reference in its entirety. The process can be used to apply a high-efficiency conformal antireflective coating to virtually any surface of arbitrary shape, size, or material. The process can be used to apply the antireflective coating to more than one surface at a time and can produce coatings that are substantially free of pinholes and defects, which can degrade coating performance. The porous polymeric material can be antireflective. The process can be used to form antireflective and antiglare coatings on polymeric substrates. The simple and highly versatile process can create molecular-level engineered conformal thin films that function as low-cost, high-performance antireflection and antiglare coatings. The method can uniformly coat both sides of a substrate at once to produce defect and pinhole-free transparent coatings. The process can be used to produce high-performance polymeric optical components, including flat panel displays and solar cells.

An optical component has a function in controlling UV, visible, or IR light, where uncontrolled alteration of light (e.g., by absorption, scattering, poor focus, haze, or other uncontrolled effects) is undesired. For example, a lens (such as may be found in eyeglasses, sunglasses, cameras, binoculars, telescopes, microscopes, protective eyewear generally, e.g., safety goggles for use in labs, shops; face shields; safety goggles for use in sports (racquetball, skiing)) is an optical component. Other items that can be considered optical components include windows (e.g., exterior windows of a building or vehicle; or interior windows such as for a cold room, walk-in refrigerator or freezer), or any transparent item for which the ability to see through clearly is desirable. Additional examples include display screens (television screens, computer monitors, small LCD displays like those on a digital watch or mobile phone), glass in a photo frame, or the outer surface of mirror glass.

The polymer coating can be an antifogging coating. The antifogging coating can prevent condensation of light-scattering water droplets on a surface. By preventing the formation of light-scattering water droplets on the surface, the coating can help maintain optical clarity of a transparent surface, e.g., a window or display screen. In some cases, an antifogging coating can also be antireflective (see, e.g., U.S. Patent Application Publication No. 2007/0104922, which is incorporated by reference in its entirety). A surface of a transparent object having the antifogging coating maintains its transparency to visible light when compared to the same object without the antifogging coating under conditions that cause water condensation on the surface. Effectiveness of an antifogging coating can be assessed, for example, by visual inspection; by measurement of relative transmittance in fogging and non-fogging conditions; or by measurement of "haze", the effect created when light is scattered upon passing through a film or sheet of a material when viewing objects through the material. ASTM D1003-07e1 (which is incorporated by reference in its entirety) details a standard test method for haze and luminous transmittance of transparent plastics; EN 167 and 168 (which are also incorporated by reference in their entirety) also describe methods for testing transmittance and variations in transmittance in the context of protective eyewear.

A lock-in or crosslinking step can enhance the durability of the coating. The lock-in can be achieved by, for example, exposure of the coating to chemical or thermal polymerization conditions. The hydrophilic polymers can become crosslinked and thereby less susceptible to mechanical damage. In some cases, chemical crosslinking step can include treatment of a polymeric coating with a carbodiimide reagent. The carbodiimide can promote the formation of crosslinks between carboxylate and amine groups of the polyelectrolytes. In some cases, chemical crosslinking step can include treatment of a polymeric coating with an aldehyde reagent. The aldehyde reagent can be a dialdehyde such as glutaraldehyde. A chemical crosslinking step can be preferred when the coating is formed on a substrate that is unstable at temperatures required for crosslinking (such as, for example, when the substrate is a plastic that would deform at the temperatures required for crosslinking). The crosslinking step can be a photocrosslinking step. The photocrosslinking can use a sensitizer (e.g., a light-sensitive group) and exposure to light (such as UV, visible or IR light) to achieve crosslinking. Masks can be used to form a pattern of crosslinked and non-crosslinked regions on a surface. The crosslinking can be between the surface and a polymer. Other methods for crosslinking polymer chains are known.

A partial list of hydrophilic polymers suitable for creating permanent anti-fog coatings is given in Table 1. In general, a combination of one or more polycations from among those listed in Table 1, and one or more polyanions from among those listed in Table 1, can be molecularly blended. Some such combinations are specified in the Examples below.

TABLE 1

| Polycations | Polyanions |
| --- | --- |
| chitosan (CHI); poly(allylamine)-co-poly(ethylene oxide) copolymer (PAH-g-PEG); poly(L-lysine)-co-(polyethylene oxide) (PLL-g-PEG); poly(quarternized-4-vinylpyridine)-co-poly(ethylene oxide) | carboxymethyl cellulose (CMC); alginic acid (AA); hyaluronic Acid (HA); heparin; pectin; poly(acrylic acid)-co-poly(ethylene oxide) copolymer (PAA-co-PEG); poly(methacrylic acid)-co- |

TABLE 1-continued

| Polycations | Polyanions |
|---|---|
| (QPVP-co-PEG); poly(diallyldimethylammonium chloride)-co-poly(ethylene oxide) (PDADMA-co-PEG); poly(allylamine)-co-polyacrylamide copolymer (PAH-co-PAAM); poly(L-lysine)-co-polyacrylamide (PLL-co-PAAM); poly(quarternized-4-vinylpyridine)-co-polyacrylamide(QPVP-co-PAAM); poly(diallyldimethylammonium chloride)-co-polyacrylamide (PDADMA-co-PAAM); poly(allylamine)-co-polyacrylamide copolymer (PAH-co-PAAM) | poly(ethylene oxide); poly(acrylic acid)-co-polyacrylamide copolymer (PAA-co-PAAM); poly(methacrylic acid)-co-polyacrylamide (PMAA-co-PAAM); carrageenan (κ, l, λ); fucoidan; fucogalactan; chondroitin; gellan gum; gum karaya; gum tragacanth; welan gum; xanthan gum; psyllium seed gum |

A partial list of hydrophilic polymers suitable for creating permanent anti-fog coatings is given in Table 2. In general, a combination of one or more polyanions from among those listed in Table 2, and one or more neutral polymers from among those listed in Table 2, can be molecularly blended. Some such combinations are specified in the Examples below.

TABLE 2

| Polyanions | Neutral polymers |
|---|---|
| carboxymethyl cellulose (CMC); alginic acid (AA); hyaluronic acid (HA); poly(acrylic acid)-co-poly(ethylene oxide) copolymer (PAA-co-PEG); poly(methacrylic acid)-co-poly(ethylene oxide) (PMMA-co-PEG); poly(acrylic acid)-co-poly(acrylamide) copolymer (PAA-co-PAAM); poly(methacrylic acid)-co-poly(acrylamide) (PMAA-co-PAAM) | poly(ethylene oxide) (PEG); polyacrylamide (PAAM); poly(vinyl alcohol) (PVA); poly(vinyl pyrrolidone) (PVP); chitosan; chitin; inulin; laminaran; pullulan; curdlan; scleroglucan; tara gum; tamarind gum; guar gum; mannan; dextran; glycogen; cellulose |

EXAMPLES

Materials and Chemicals: Carboxymethylcellulose (CMC) (Mw=250,000), chitosan (CHI) (Low Molecular Weight), alginic acid sodium salt (viscosity 20,000-40,000 cps) and sodium chloride were obtained from Sigma Aldrich. Poly (acrylic acid) (PAA) (25% aqueous solution, Mw=90,000) was obtained from Polysciences (Warrington, Pa.). Deionized water was exclusively used in all aqueous solutions and rinsing procedure. Glass slides were microscopy slides obtained from VWR (VWR microslides premium plain Cat. No. 48300-047) 3×1 inch and 1 mm thick. Polycarbonate slides were obtained from Teijin Chemical Ltd. 1-ethyl-3-(3-dimethylaminopropyl) carbodiimide hydrochloride (EDC) and N-hydroxysulfosuccinimide (NHS) were purchased from Thermo Scientific. Poly(acrylic acid)-graft-poly(ethylene oxide) (PAA-g-PEO) was synthesized according to the procedures of Irvine et al., *Biomacromolecules* 2, 85 (2001); and Mayes et al., *J. Mem. Sci.* 298, 136 (2007), each of which is incorporated by reference in its entirety.

Thickness measurements for multilayers assembled on glass substrates were performed with a Tensor P16 surface profilometer (PL) using a 2 μm stylus tip and 2 mg stylus force. The topographical image of the multilayer was collected using a Nanscope IIIa, Dimension 3000 AFM microscope (Digital Instruments, Santa Barbara) in the tapping mode in air. Variable-angle spectroscopic ellipsometry (EL) was used to measure the thickness and refractive index of the coating on polycarbonate substrates. Contact angle measurements were carried out with a VCA-2000 contact angle system (AST Products, Inc., MA). Contact angle values were calculated from dynamic video files that captured at 60 frames/s using the software provided (VCA Optima XE Version 1.90) by the manufacturer.

The anti-fog properties were evaluated by a slightly modified European Standard Test (EN168, which is incorporated by reference in its entirety) and by a humidity chamber and aspiration test. In the first case, the temperature of water in the humidity chamber and the humidity of the chamber were set at 23° C. and 100% respectively. The relative transmittance of a sample was evaluated as a criterion for the anti-fog properties of the coating. The relative transmittance was recorded as (Tr %)=($T_f/T_i$)*100, where the transmittance of the coating during the fogging condition is ($T_f$), and the initial transmittance in non-fogging conditions is ($T_i$). In the second case, a climate chamber was used to set up different environmental conditions. The humidity within the chamber was controlled with an ultrasonic humidification system and ventilation system. A slide coated with an antifog coating was evaluated by recording an image of the slide at 37° C. and 80% humidity at various times in the chamber. For quick evaluation of the antifog performance of the coatings, a simple test was used involving simply aspirating/breathing on the samples.

Mechanical strength of coatings was evaluated by a pencil hardness tester, a Kimwipe test, and a cloth-sponge test. In the Kimwipe test, the coating on a substrate was rubbed by hand vigorously by using laboratory Kimwipes 10 times. In the pencil hardness test, the coating on the glass substrate was tested according to ASTM D3363 (also referred to as ECCA-T4/1 or ISO 15184), each of which is incorporated by reference in its entirety. The coated substrate was placed horizontally under the pencil tip and the pencil tester was moved in one direction. The force applied to the pencil tip came from a 750 g load. The scratched regions were evaluated by optical microscopy. In the cloth-sponge test, the coating was first wet with water or soap solution (2% MICRO-90 solution from International Products Corporation) and rubbed with a cloth (ANTICON, Lot#5562) or a cellulose sponge under different conditions. In the first test, the wet coating was rubbed with a wet sponge ten times. In the second test, the wet coating was rubbed with a wet cloth ten times. In the third test, the wet coating was rubbed with a dry cloth ten times. The last challenge was considered the most rigorous test of mechanical strength among the cloth-sponge tests.

Hydrophilic antifog coatings were prepared on glass, polycarbonate, and sapphire substrates by using a simple layer-by-layer dipping or spraying technique. This process, called "layer-by-layer" assembly involves the sequential contacting of the substrate into solutions of different polymers. When two different polymer solutions are used, the deposition of each cycle of complimentary polymers creates a "bilayer," which includes a molecular-level blend of the polymers. The notation $(Poly1/Poly2)_n$ conveniently describes the structures of assembled coatings. Here, Poly1 and Poly 2 are the abbreviations that identify specific polymers used in assembly and n is the number of bilayers deposited. Therefore, a ten bilayer coating comprising chitosan and carboxylmethylcellulose can be noted as $(CHI/CMC)_{10}$.

The assembled coatings can be rendered more mechanically robust by covalent crosslinking. Crosslinking can be achieved, for example, by using well-established EDC/NHS chemistry, or by thermal treatments (for example, in the range of 100° C. to 250° C., e.g., at 130° C.). The coatings prepared from either chitosan/carboxymethylcellulose or chitosan/poly(acrylic acid-polyethylene oxide copolymer) exhibited hydrophilic wetting properties. The polar groups or elements of these polymers can have strong interactions with water via polar-dipole, H-bonding, or polar-polar interactions. As a result, the growth of light-scattering water droplets can be inhibited, because water condensing on the coated surface interacts more strongly with the polymer(s) than with other water molecules. Natural polymers such as chitosan, or carboxylmethylcellulose and synthetic copolymers such as poly(ethylene oxide) grafted poly(acrylic acid) copolymers, are particularly well suited for this effect and significantly outperformed commonly used polyelectrolytes (PE) such as poly(acrylic acid) (PAA), and poly(allyamine) (PAH). The ability of CHI, CMC, and PAA-co-PEG to inhibit droplet growth can be related to their ability to interact strongly with water via hydrogen bonds. For example, in antifog experiments, the multilayer systems prepared from PAA and CHI or from PAH and CMC did not provide acceptable antifog performance. Also, chemically immobilized monolayers of these materials on glass substrates did not provide acceptable antifog properties. All of these coatings (i.e., natural polymer/simple synthetic polyelectrotye, such as CHI/PAA and CMC/PAA) failed both the humidity chamber and aspiration tests.

Example 1

Coating Assembly

The adsorption of all polymer/polymer systems on glass, sapphire, and polycarbonate slides was carried out with a Stratosequence VI spin dipper (Nanostrata inc.) controlled by StratoSmart v6.2 software. Dipping times for the polymers was 10 minutes followed by three rinses in the same pH water as the pH of polymer solution. One two-minute and two one-minute rinses were used between polymer dips. The concentration of chitosan (CHI) and carboxymethylcellulose (CMC) was 0.1 wt %. In the CHI/PAA-g-PEO coatings, the concentration of PAA-g-PEO was 0.07 wt %. The pH of the polymer solutions and water was adjusted with either HCl or NaOH.

Figure 2:
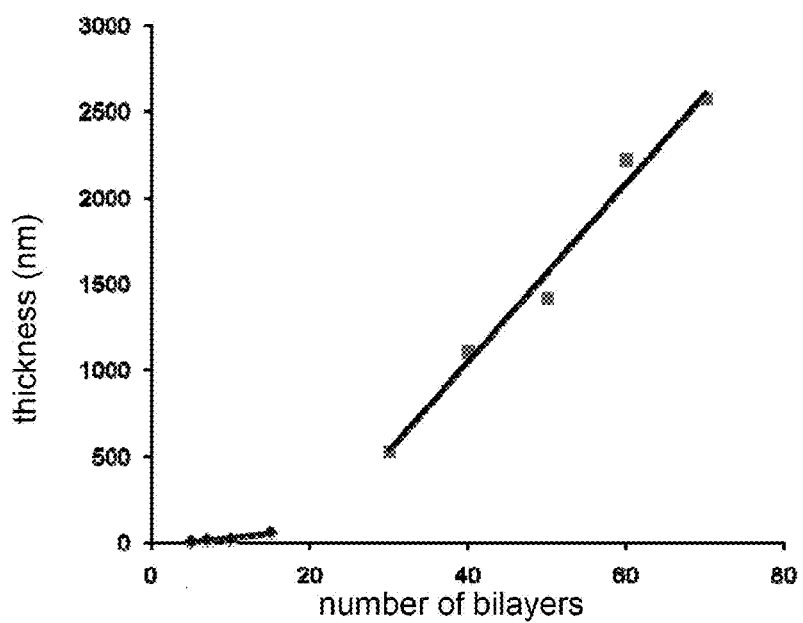
FIG. 2 is a graph depicting thicknesses of (CHI/CMC) coatings as a function of number of bilayers.
Figure 3:
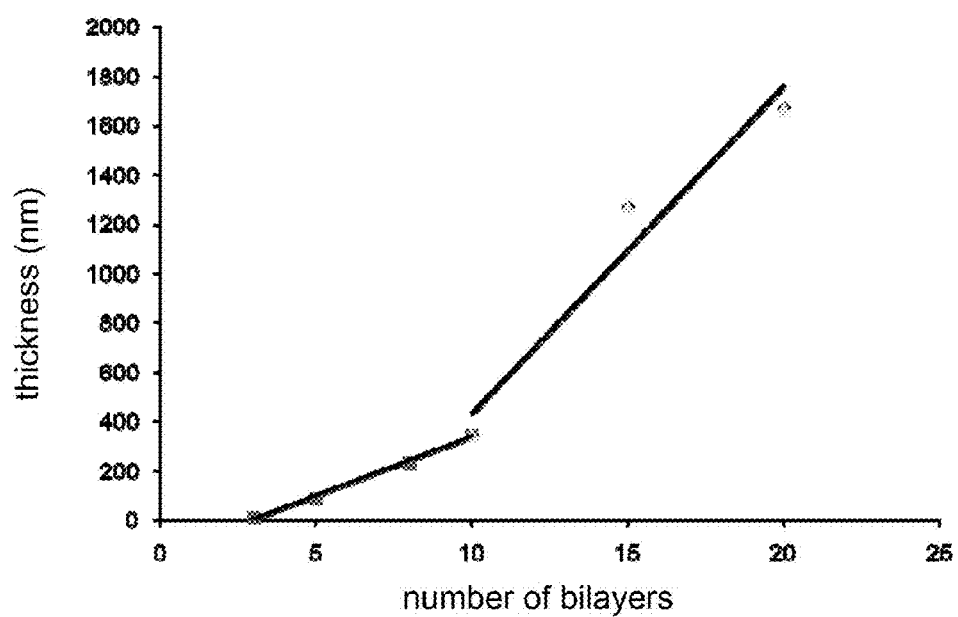
FIG. 3 is a graph depicting thicknesses of (CHI/PAA-g-PEG) coatings as a function of number of bilayers.

The thickness growth of the chitosan/carboxymethyl cellulose system as a function of the number of deposited bilayers on glass substrates was measured (FIG. 2). The thickness of a 10 bilayer coating was around 23 nm. When the number of bilayers was 20, the thickness of the coating reached 72 nm. The thickness of a 30-bilayer coating rose to 570 nm on a glass substrate. The same growth trend was found on polycarbonate substrates. The thickness growth of chitosan/PAA-g-PEO coatings was also measured (FIG. 3). Thicknesses of 8 and 10 bilayer coatings were 200 nm and 300 nm, respectively.

Example 2

Crosslinking Chemistry the chitosan and carboxymethylcellulose system was crosslinked by using traditional coupling reactions involving EDC and NHS. A 10 bilayer $(CHI/CMC)_{10}$ coating assembled at pH 4 onto glass and polycarbonate substrates was immersed into a pH 4.5 solution of 400 mM EDC and 100 mM NHS for 15 minutes and then rinsed with the same pH.

Example 3

Anti-Fog Tests

The transmission of coatings on glass and polycarbonate was measured at 100% humidity and 23° C. The crosslinked 10 bilayer CHI/CMC coating showed high transparency (94%). After the substrate was placed into the humidity chamber for 120 seconds, the relative transmission (Tr) was 95%. The relative transmission (Tr) of the coating on polycarbonate after this treatment was 75%.

Figure 4:
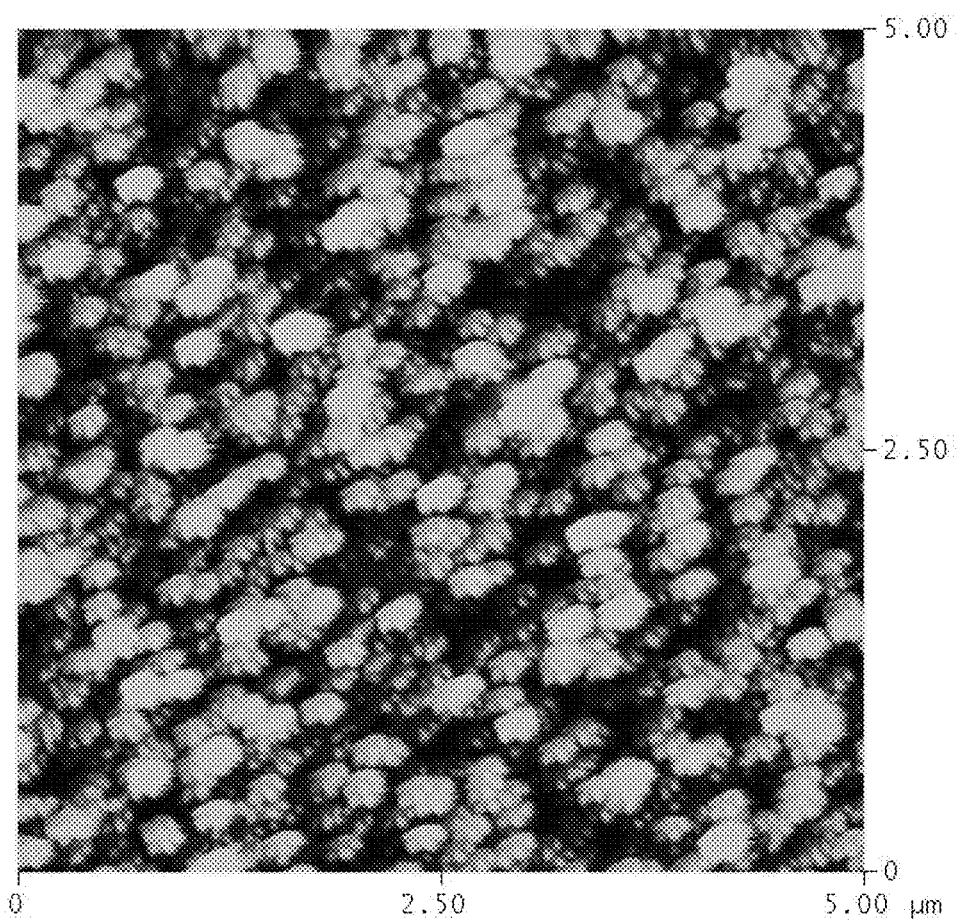
FIG. 4 is a topographical AFM image of a crosslinked 10 bilayers CHI/CMC coating on a glass substrate.

The transmission of the chitosan/PAA-g-PEG coating on glass and polycarbonate was measured at 100% humidity and 23° C. Coatings having 15 bilayers showed high transparency on glass (92%). After the substrate was placed into the humidity chamber for 70 seconds, the relative transmission (Tr) was 100%. The relative transmission (Tr) of the coating on polycarbonate was 99%. The haze of the both coatings was 0.2%, which was much better than the 5% haze of a coating as described in U.S. Pat. No. 5,804,612, which is incorporated by reference in its entirety. FIG. 4 shows a topographical image of a crosslinked 10 bilayer chitosan/carboxymethyl cellulose coating prepared on a glass substrate.

Both coatings showed excellent anti-fog performance by the aspiration and humid chamber test. The second humid chamber test was conducted at 80% humidity and 37° C. and images were recorded after 1 sec, 10 sec, 30 sec, 2 minutes, 3 days, and one week. Both coatings show excellent anti-fogging performance—no fogging was observed from 1 second to one week.

Example 4

Aging Studies

Figure 5:
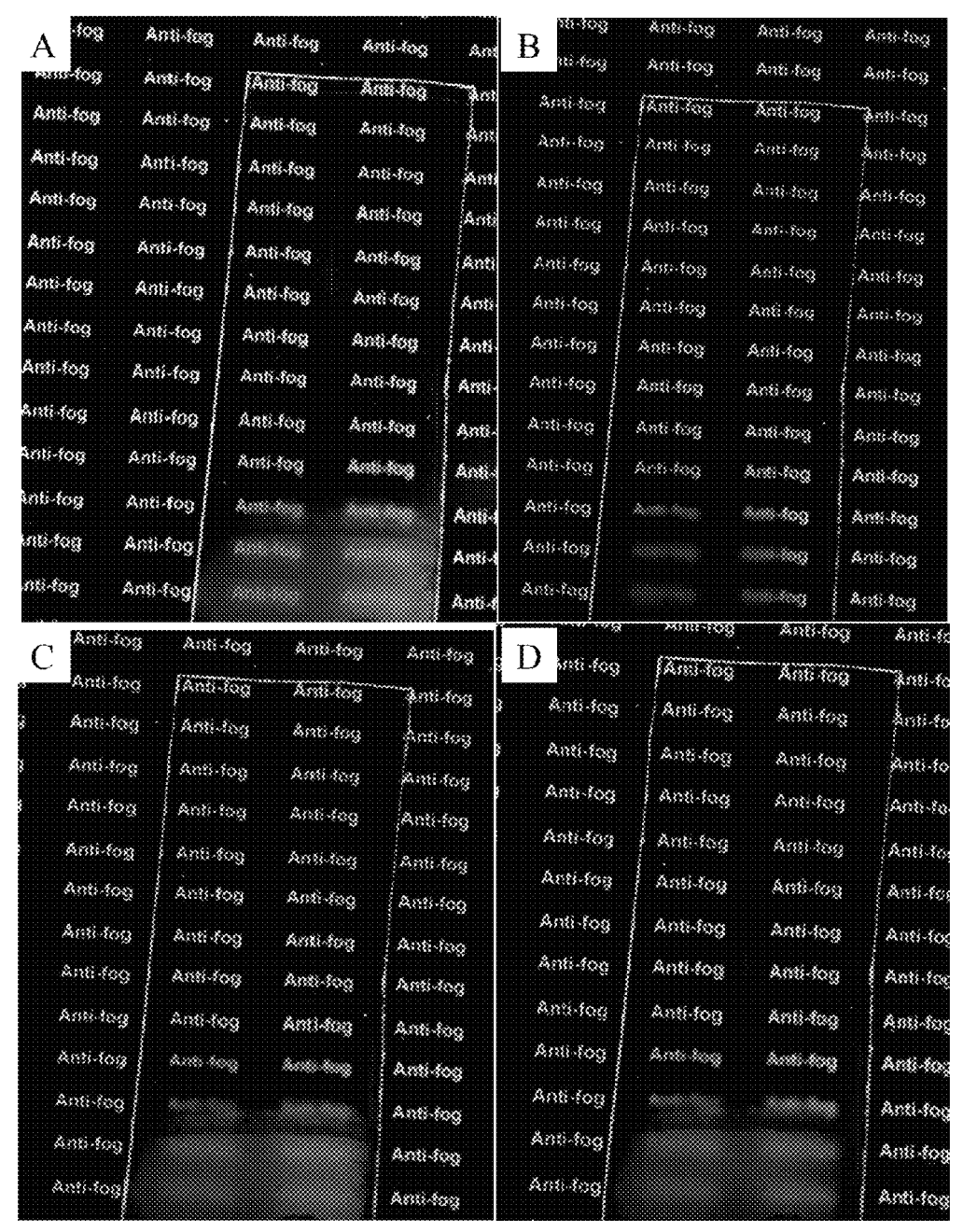

Both types of antifog coatings showed excellent and long lasting anti-fog performance after being placed in a refrigerator (0° C. to 4° C.) for one month. Images of the coatings recorded after this treatment are shown in FIG. 5. Both coatings were tested after two months' storage in air. They still showed excellent antifog properties.

Example 5

Different Copolymer Compositions

Figure 6:
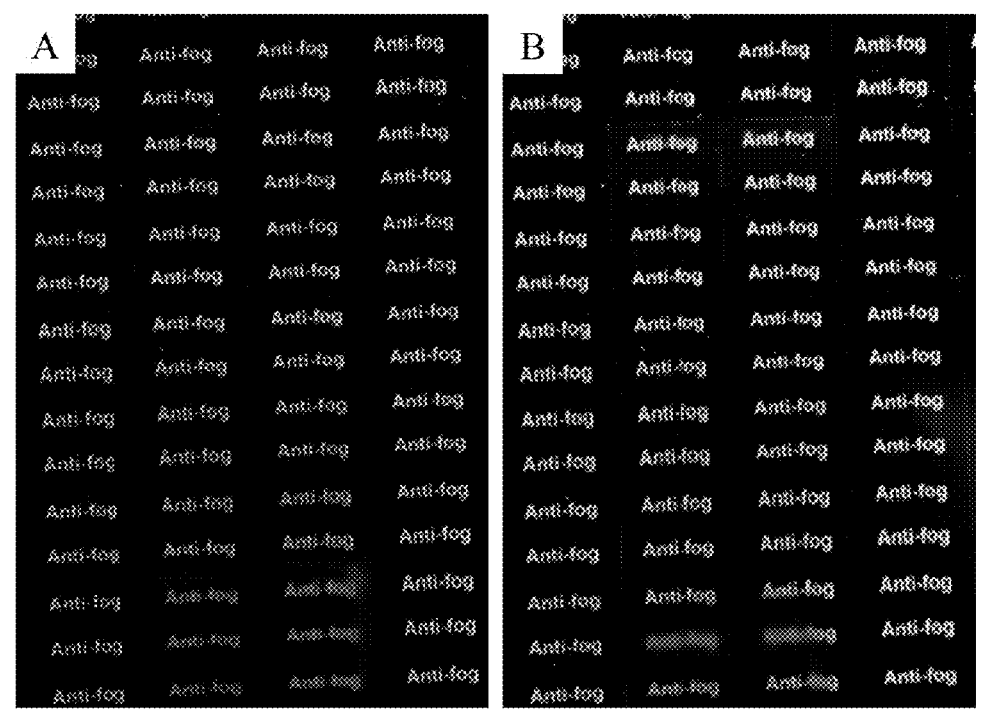
Figure 7:
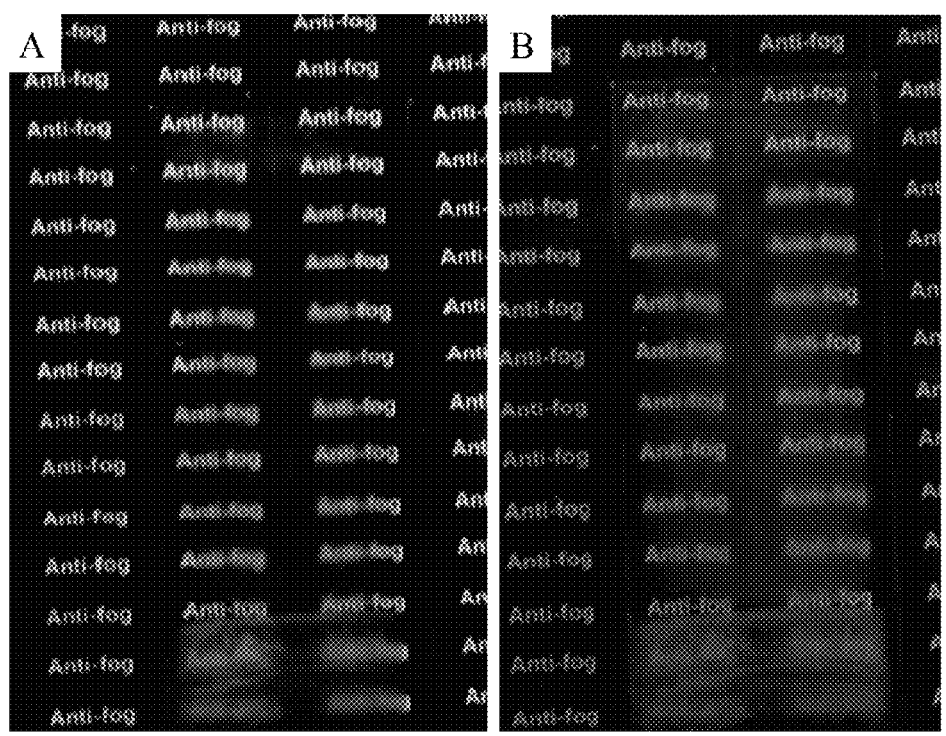
FIGS. 7A-7B are photographs depicting results of a humid chamber test for antifog coatings. 10-bilayer CHI/PAA-g-PEG (25% PEG) coatings were exposed to 80% humidity at 37° C. for (A) 1 second; and (B) 20 seconds.

To find out the hydrophilicity effect on the coating of chitosan and PAA-g-PEG, PAA-g-PEG copolymers with different ratios of poly(acrylic acid) and poly(ethylene oxide) were synthesized and their antifog properties were evaluated. When the PEG component in the PAA-g-PEG copolymer was 37% by weight (FIG. 6), the chitosan and PAA-g-PEG coating displayed excellent antifog performance. When the PEG amount in the copolymer was 25% by weight, the chitosan and PAA-g-PEG coating did not exhibit good antifog performance (FIG. 7). The images in FIGS. 6-7 were recorded with the samples in the humidity chamber at 37° C. and 80% humidity at the time interval of 1 second and 20 seconds.

Example 6

Figure 8:
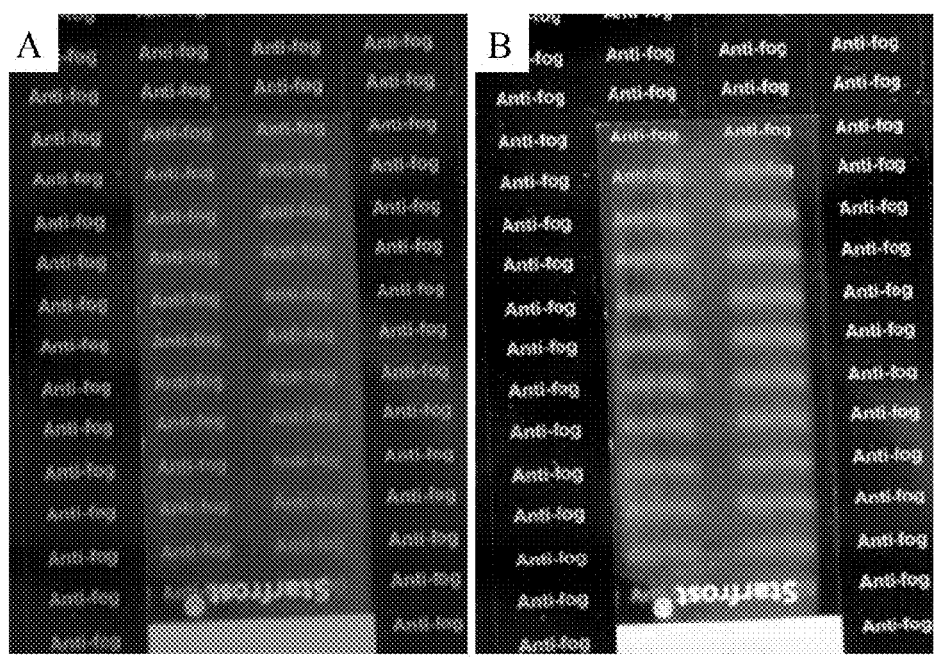
FIGS. 8A-8B are photographs depicting results of a humid chamber test for coatings. A CMC monolayer coating was exposed to 80% humidity at 37° C. for (A) 1 second; and (B) 20 seconds.
Figure 9:
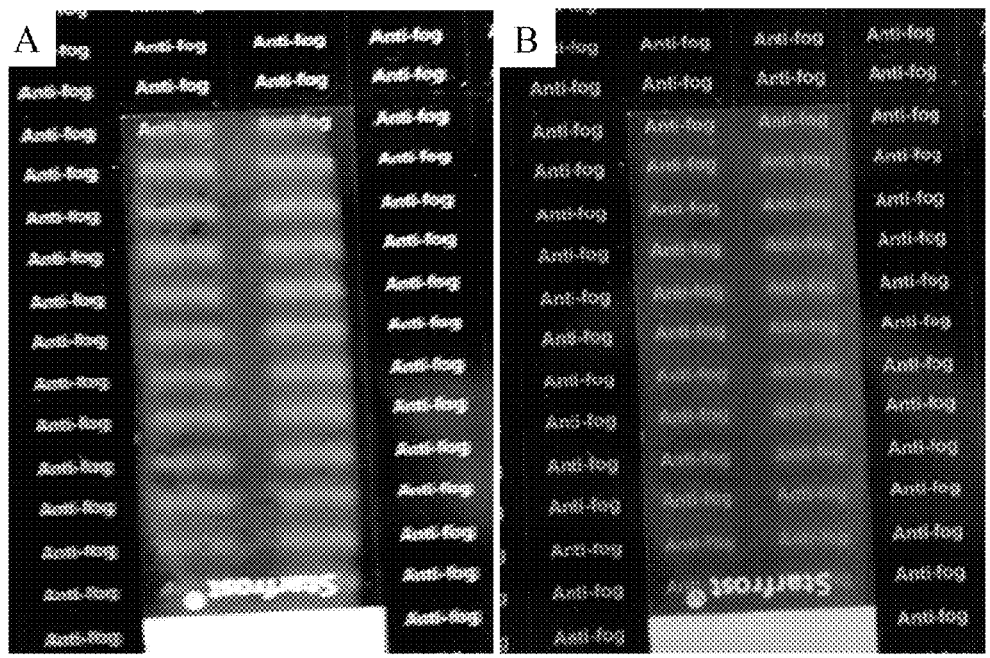
FIGS. 9A-9B are photographs depicting results of a humid chamber test for coatings. A PAA-g-PEG (50% PEG) monolayer coating was exposed to 80% humidity at 37° C. for (A) 1 second; and (B) 20 seconds.

Excellent antifog properties required a critical thickness of the molecularly blended hydrophilic polymers. For the chitosan/CMC multilayer, the coating had good antifog properties when the thickness was greater than 20 nm. For the chitosan/PAA-g-PEG multilayers, good antifog performance was achieved when the coating was at least 10 nm thick. A single layer coating comprised of only carboxy methylcellulose or PAA-g-PEG chemically bonded to a surface did not exhibit anti-fog performance. Such coatings fog immediately when placed in the humidity chamber (37° C. and 80% humidity) (FIGS. 8-9). This demonstrated that molecularly blended layers of suitable hydrophilic polymers are needed to create a long-lasting anti-fog coating.

Example 7

Coating for Safety Goggles

Figure 10:
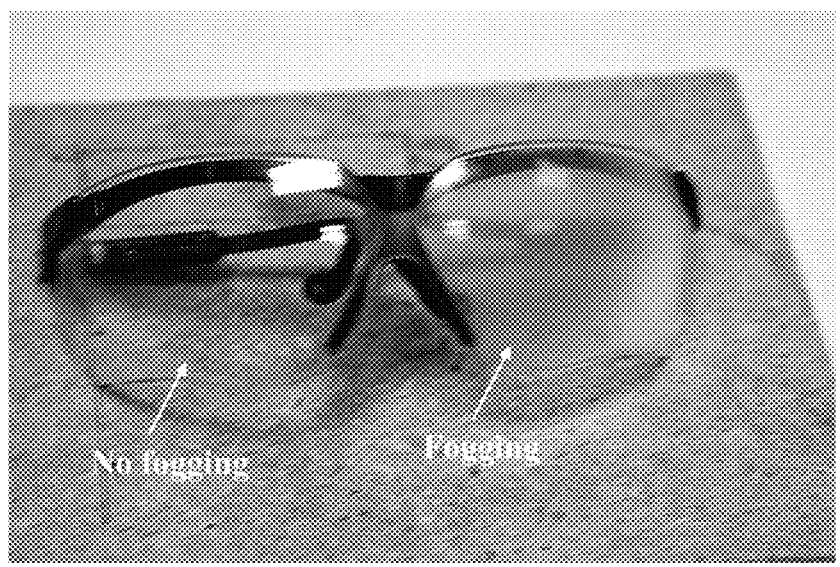
FIG. 10 is a photograph depicting a pair of safety goggles where one lens (to the left) was coated with 10 bilayers of CHI/PAA-g-PEG (50% PEG) and one lens (to the right) was untreated. The photograph was taken after the goggles were placed in the refrigerator (4° C.) for one month.

One lens of a polycarbonate safety goggle was coated with 10 bilayers of chitosan and PAA-g-PEG; the other lens was left uncoated. The goggles were then placed in a refrigerator for one month at 4° C. The coated goggle was removed from the refrigerator and an image was taken after exposure to hot water steam. The coated lens exhibited excellent antifog performance whereas the non-coated lens fogged immediately in steam (see FIG. 10).

Example 8

Figure 11:
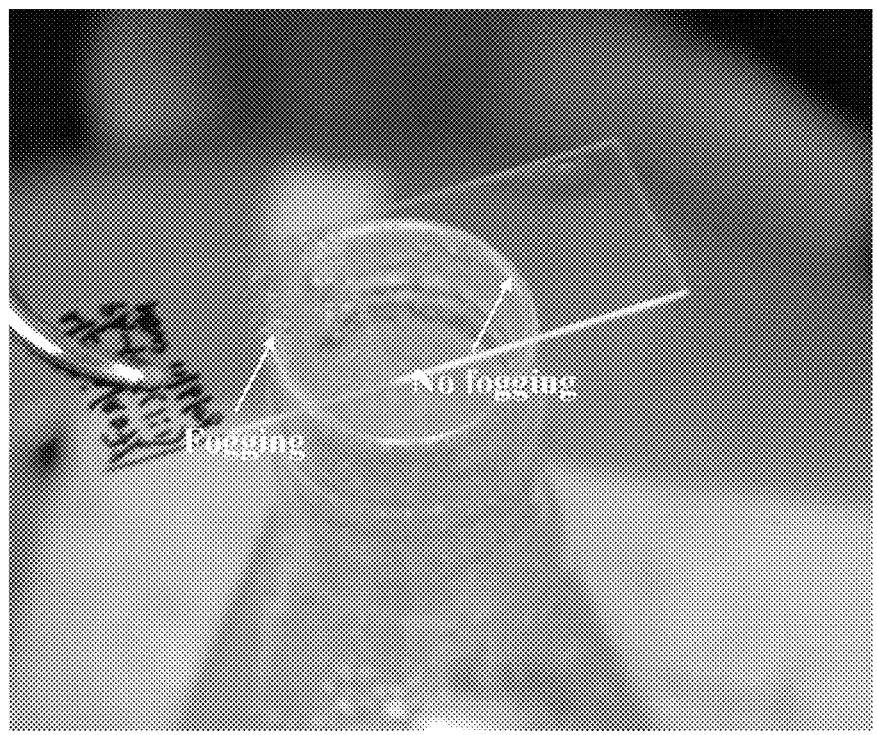
FIG. 11 is a photograph depicting a glass substrate coated at one end (to the right) with CHI/PAA-g-PEG (50% PEG) and uncoated at the other end (to the left). The glass was substrate was directly exposed to hot steam after being placed in refrigerator at 4° C. for two weeks.
Figure 12:
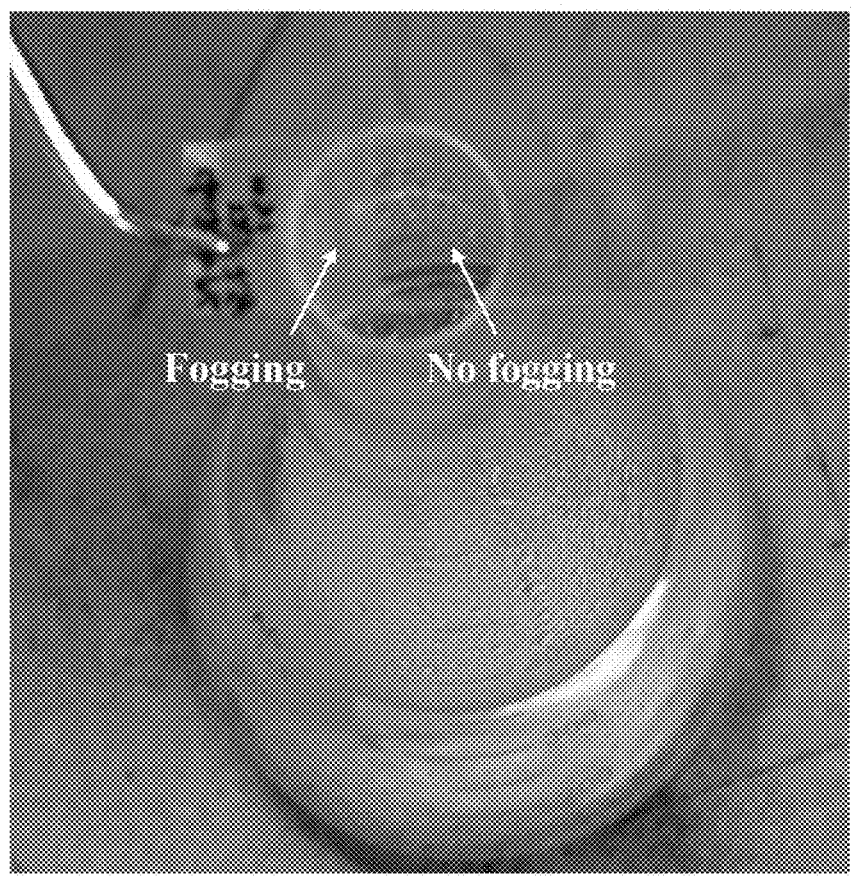
FIG. 12 is a photograph depicting a glass substrate coated at one end (to the right) with CHI/PAA-g-PEG (37% PEG) and uncoated at the other end (to the left). The glass was substrate was directly exposed to hot steam after being placed in refrigerator at 4° C. for two weeks.

Anti-Fog Tests for Glass Substrates two glass substrates coated with different coatings were evaluated by direct exposure to hot steam after being placed in the refrigerator for two weeks. As shown in FIGS. 11-12, the coatings comprising either chitosan and PAA-g-PEG (37% PEG) or chitosan and PAA-g-PEG (50% PEG) showed excellent anti-fog properties.

Example 9

Mechanical Durability Test

Figure 13:
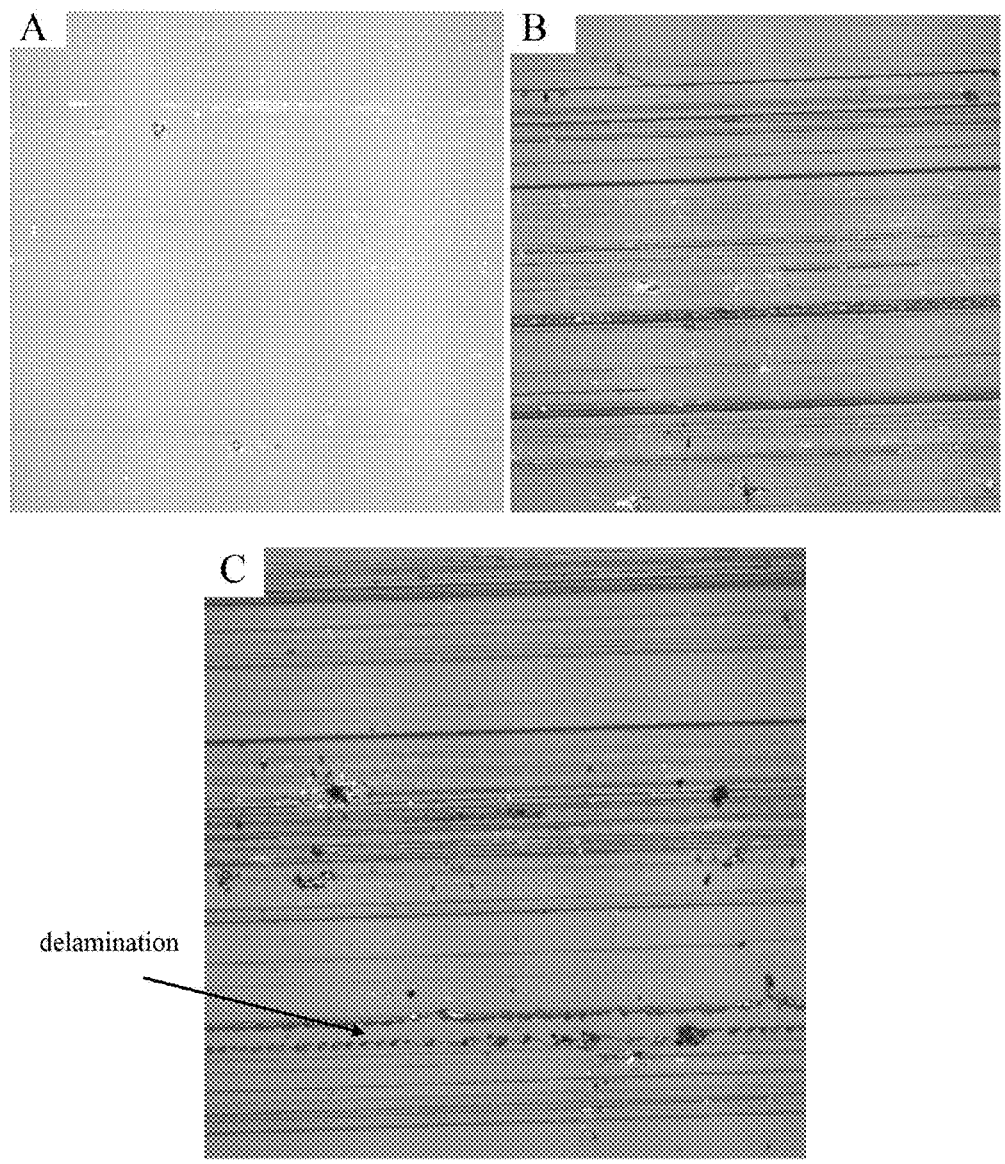
FIGS. 13A-13C are micrographs of 15 bilayer coatings of CHI/PAA-g-PEG (37% PEG) after pencil hardness tests: (A), 2H; (B), 4H; and (C), 7H.

The mechanical durability of the CHI/CMC and CHI/PAA-g-PEG (37% PEG) coatings was examined by aggressive wiping with a laboratory Kimwipe. After wiping, no visible damage was observed in either coating; and both coatings retained their antifog properties. This observation contrasted to antifog coatings based on nanoporous arrays of nanoparticles (see, for example, U.S. Patent Application Publication No. 2008/0268229, which is incorporated by reference in its entirety). Aggressive wiping compromised the antifog behavior of nanoparticle-based coatings, due to a smoothing of the surface layers. The excellent mechanical strength of both polymer-based coatings was further enhanced upon chemically bonding to a glass substrate. A pencil hardness test of CHI/CMC and CHI/PAA-g-PEO as-assembled coatings revealed a hardness of 2H. Thermally crosslinked coatings had a pencil hardness of 6H, and no delamination was observed by optical microscopy. FIGS. 13A-13C shows the pencil hardness of 15 bilayers of chitosan and PAA-g-PEG (37% PEG) at different pencil tests. Its hardness shows 2H. A 7H pencil applied to the coating caused delamination of the coating (FIG. 13 C).

Example 10

Enhancing the Mechanical Strength of the Anti-Fog Coating

Glass and other silica-rich substrates, certain polymeric substrates, and sapphire substrates can be chemically modified before a coating is applied; the modification can enhance the mechanical strength of the coating. Silica-rich substrates include transparent substrates that have reactive silanol groups, such as, for example, glass, silica, and quartz. Polymeric substrates that can be chemically modified before a coating is applied include polycarbonate and PMMA. Substrates were chemically modified by forming covalent bonds between an epoxysilane compound (3-glycidoxypropyl)trimethoxysilane and the hydroxyl or silanol groups on the substrates. This modification proceeded via hydrolysis and condensation reactions. Branched poly(ethyleneimine) (PEI) was then exposed to the epoxy-functionalized surface. Reactive amino groups of PEI react with epoxy groups, providing a modified surface having amino groups.

The glass-like substrate was first sonicated in water for 5 minutes and cleaned in an oxygen plasma for 2 minutes at 120 mTorr or heated in piranha solution for 30 minutes at 80° C. The cleaned substrate was immediately incubated with a anhydrous toluene solution of 1% (3-glycidoxypropyl)trimethoxysilane overnight, then rinsed with pure toluene. Toluene can be replaced by other anhydrous organic solvents such as chloroform and hexane. The dried substrate was immersed in a 0.01 M aqueous solution of branched PEI (pH=9) for at least 4 hours and subsequently rinsed with water. Next, multilayers of CHI/CMC were assembled onto the PEI-modified substrate. The substrate with the assembled multilayer of CHI/CMC was then immersed into 0.05 M MES buffer (pH 5) including 200 mM EDC and 50 mM NHS for 30 minutes and subsequently immersed into 1×PBS buffer for 20 minutes. The crosslinked multilayer of CHI/CMC on the glass-like substrate was then rinsed with water. The antifog coatings thus formed were not only chemically bonded between layers, but also chemically bonded to the functionalized substrates.

Figure 14:
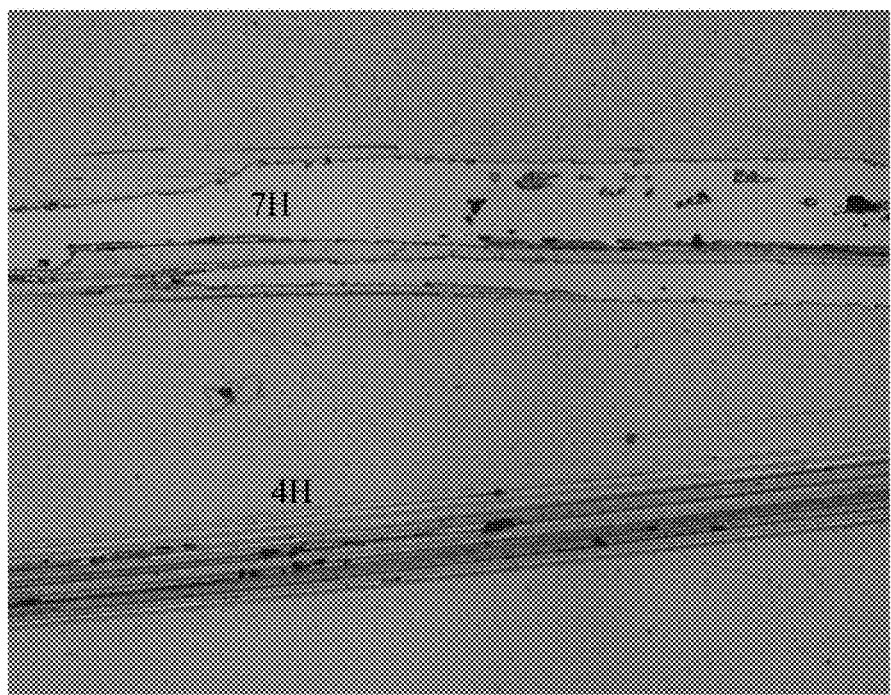
FIG. 14 is an optical image of a 15.5 bilayer coating of CMC/CHI cross-linked with both EDC/NHS and glutaraldehyde after being tested with 4H (lower) and 7H (upper) pencils.

To further crosslink the multilayers, the coating was then immersed into an aqueous solution of 2.5% glutaraldehyde (pH=9) at 30° C. for 45 minutes. The substrate was then rinsed with water. The crosslinked coatings on a glasslike or sapphire substrate were evaluated by a KIMWIPE test, pencil test and cloth-sponge test. The KIMWIPE test showed no visible scratches and excellent mechanical strength. A pencil test of the EDC/NHS and glutaraldehyde crosslinked (CMC/CHI)$_{15.5}$ coating showed a 4H pencil hardness (FIG. 14). At a pencil hardness of 7H, this coating exhibited delamination. A 12.5 bilayer coating of CMC/CHI crosslinked with EDC/NHS showed no damage after rubbing with a wet cloth or a wet sponge; however, scratches and/or delamination occurred after being rubbed in the wet condition with a dry cloth. In contrast, the 12.5 bilayer coating of CMC/CHI crosslinked with both EDC/NHS and glutaraldehyde showed no visible damage after the wet coating was rubbed with dry cloth.

Other embodiments are within the scope of the following claims.

What is claimed is:

1. An article comprising a surface coated with an antifog coating, the coating comprising:
   a first hydrophilic polymer; and
   a second hydrophilic polymer, wherein the second hydrophilic polymer includes a plurality of hydrogen bonding groups;
   wherein the first and second hydrophilic polymers are molecularly blended and the first hydrophilic polymer and the second hydrophilic polymer are chemically cross-linked to one another or thermally cross-linked to one another.

2. The article of claim 1, wherein the first hydrophilic polymer includes a plurality of ionized or ionizable groups.

3. The article of claim 2, wherein the second hydrophilic polymer includes a plurality of ionized or ionizable groups.

4. The article of claim 1, wherein at least one of the first and second hydrophilic polymers is a copolymer including a first plurality of ionized or ionizable groups and a second chemically distinct plurality of hydrogen bonding groups.

5. The article of claim 1, wherein the article is an optical component.

6. The article of claim 1, wherein the article is an eyewear lens.

7. The article of claim 1, wherein the article is transparent, and has a relative transmittance ($T_r$) of greater than 90% after being exposed to 100% humidity at 23° C. for at least 60 seconds.

8. The article of claim 1, wherein the article is transparent, and has a haze of less than 1.0% after being exposed to 100% humidity at 23° C. for at least 60 seconds.

* * * * *